(12) United States Patent
Szafraniec et al.

(10) Patent No.: US 6,175,410 B1
(45) Date of Patent: Jan. 16, 2001

(54) FIBER OPTIC GYROSCOPE HAVING MODULATED SUPPRESSION OF CO-PROPAGATING AND COUNTER-PROPAGATING POLARIZATION ERRORS

(75) Inventors: Bogdan Szafraniec, Phoenix; James N. Blake, Scottsdale; Charles H. Lange, Glendale, all of AZ (US); Lee K. Strandjord, Tonka Bay, MN (US)

(73) Assignee: Honeywell Inc., Morristown, NJ (US)

( * ) Notice: Under 35 U.S.C. 154(b), the term of this patent shall be extended for 0 days.

(21) Appl. No.: 09/215,581

(22) Filed: Dec. 17, 1998

(51) Int. Cl.$^7$ .................................................. G01C 19/72
(52) U.S. Cl. ........................................................ 356/350
(58) Field of Search ................................ 356/350; 385/12

(56) References Cited

U.S. PATENT DOCUMENTS

| | | | |
|---|---|---|---|
| 4,645,345 | * 2/1987 | Domann | 356/350 |
| 5,009,480 | * 4/1991 | Okada et al. | 356/350 |
| 5,018,859 | 5/1991 | Chang et al. | 356/350 |
| 5,327,213 | 7/1994 | Blake et al. | 356/350 |
| 5,377,283 | 12/1994 | Blake et al. | 356/350 |
| 5,469,257 | 11/1995 | Blake et al. | 356/350 |
| 5,473,430 | 12/1995 | Kemmler | 356/350 |
| 5,781,300 | * 7/1998 | Strandjord et al. | 356/350 |

* cited by examiner

Primary Examiner—Samuel A. Turner
(74) Attorney, Agent, or Firm—Kris T. Fredrick

(57) ABSTRACT

A fiber optic gyroscope having polarization error-correcting modulation. Polarization errors originate from the interference of primary waves and secondary cross-coupled waves. Although these error signals are very difficult to remove modulation signals may be applied to the integrated optics chip that minimize the total error over a period of time. By providing distinct but inter-related modulation signals to opposing inputs of the sensing coil, the various polarization errors can be averaged to zero over the period of the modulation signals.

59 Claims, 10 Drawing Sheets

US 6,175,410 B1

FIBER OPTIC GYROSCOPE HAVING MODULATED SUPPRESSION OF CO-PROPAGATING AND COUNTER-PROPAGATING POLARIZATION ERRORS

BACKGROUND

In a typical fiber optic gyroscope, there are polarization phenomena that cause erroneous rotation detection by the gyroscope. Some polarization errors are caused by light being cross-coupled from one polarization state to another. In gyroscopes having, for example, a proton exchange integrated optical circuit, cross-coupling occurs at the coupling of integrated optical circuit with a light source and an optical fiber sensing loop. A phase modulator on such integrated optical circuit affects one polarization state of light differently than another for a given signal applied to the modulator. Certain origins and characteristics of various polarization errors appear to have not been known in the art prior to the present invention. Discoveries of such origins and characteristics and ensuing solutions are presented here.

SUMMARY OF THE INVENTION

A design for suppressing amplitude and intensity type polarization errors in fiber optic gyroscopes uses sophisticated modulation signals. The phase modulator or modulators within the sensing loop of the gyroscope act upon the light polarized along the pass axis of the polarizer differently than upon the small amount of light polarized along the reject axis of the polarizer. This situation exists in the case of integrated optical circuit modulators. For a proton-exchange lithium niobate modulator, the remaining reject axis light is essentially unmodulated in phase since it takes a different physical path through the integrated optical circuit. The waveguide only guides one polarization of light. The leakage of the other polarization state of the light through the chip is due to scattered light, which bypasses the phase modulator. The present invention, which eliminates the resulting polarization errors, applies to both polarization maintaining (PM) and depolarized (SM) type fiber optic gyroscopes.

There are several implementations for achieving this polarization error suppression. One is an open-loop signal processing system that suppresses some polarization errors by bias modulation, and suppresses remaining errors by decorrelation techniques. Such techniques are mentioned in U.S. Pat. No. 5,327,213 by Blake et al., issued Jul. 5, 1994, and entitled "Configuration Control of Mode Coupling Errors," which is incorporated by reference in the present description. Also, U.S. Pat. No. 5,377,283 by Blake et al., issued Dec. 27, 1994, and entitled "Configuration Control of Mode Coupling Errors," is incorporated by reference in the present description. Another open-loop processing system suppresses some polarization errors with bias modulation, and suppresses other polarization errors with a modulation signal meeting specific criteria supplied to a second phase modulator located on the opposite side of the sensing loop. A closed-looped signal processing system having ramp-like waveforms meeting certain criteria are supplied to modulators located on both sides of the loop, while the bias modulation signal is supplied to a modulator on either one or both sides of the loop.

General equations have been developed to describe the amplitude and intensity type polarization errors. These equations incorporate the fact that the phase modulators do not affect the two polarization states in the same way. In this case, there is negligible a.c. (alternating current) interference between the primary and spurious co-propagating waves in the loop. The primary waves are of the preferred polarization and the spurious or secondary waves are of the rejected polarization. Such is the situation in all-fiber gyroscopes. All significant polarization errors arise due to interferences between the various counter-propagating waves in the loop.

The present invention solves the polarization error problem in the situation wherein the phase modulator or modulators do not affect the primary and secondary polarization states in the same way, co-propagating waves also yield a.c. interference terms that fall within the demodulation bandwidth of the gyroscope. In this case, four types of amplitude polarization errors and one type of intensity polarization errors result. The different types of errors are distinguished and have various modulations applied to eliminate them. The modulations applied to the various error interferences are also different from the modulation applied to the main signal. This fact allows for the possibility that errors can be suppressed by modulation techniques, while maintaining good signal sensitivity. The present invention suppresses these errors.

DESCRIPTION OF THE EMBODIMENTS

Figure 1:
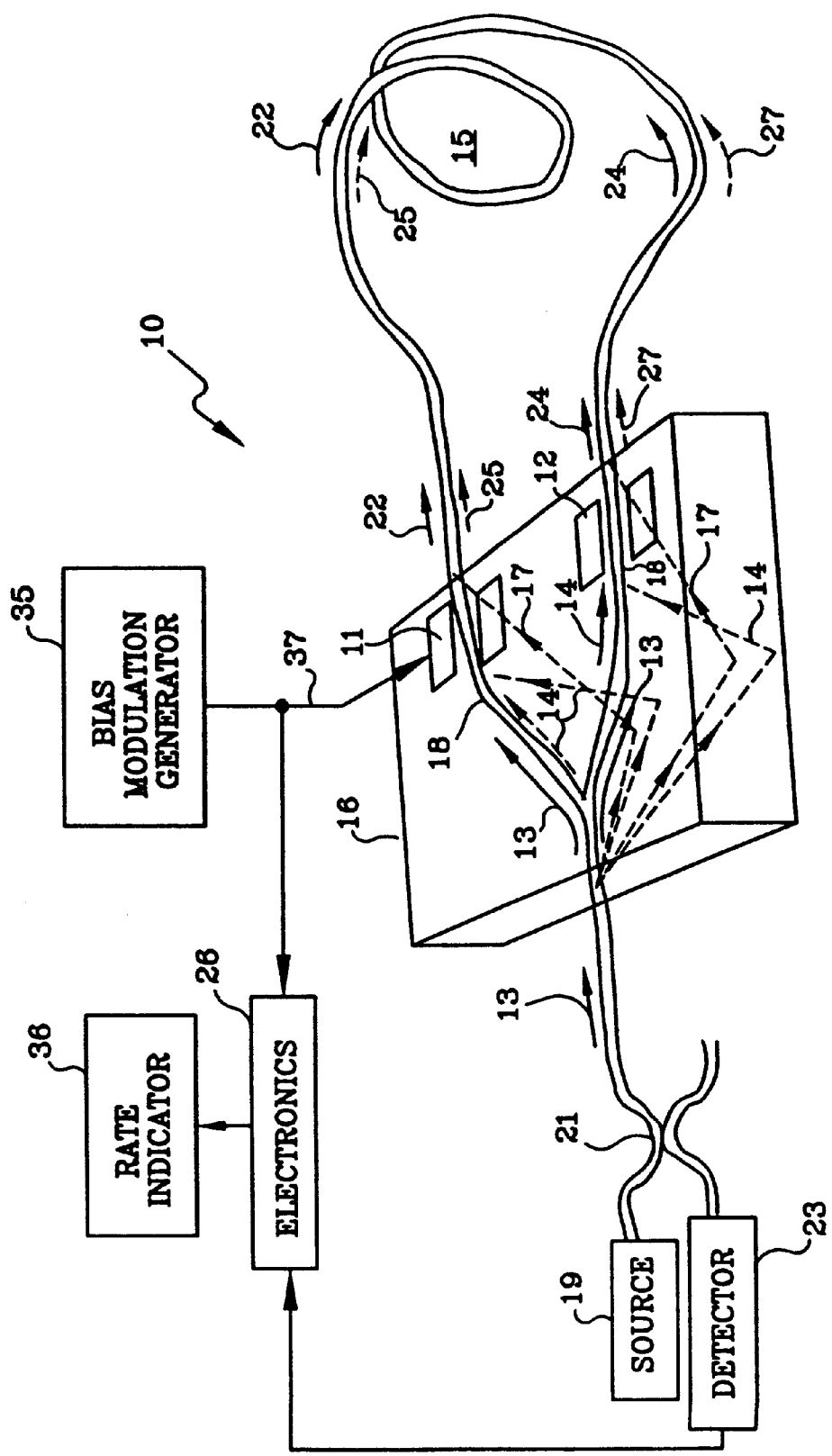
FIG. 1 illustrates a fiber optic gyroscope with an integrated optical circuit (IOC) having a light splitter and modulators, with various light paths.

The present invention for suppressing amplitude and intensity type polarization errors in fiber optic gyroscopes uses sophisticated modulation signals. It requires that phase modulator 11 or modulators 11 and 12 within a sensing loop 15 of gyroscope 10 of FIG. 1, act upon light 13 polarized along the pass axis of a proton-exchange lithium niobate LiNbO$_3$ integrated optical circuit 16 (inherently a polarizer) differently than the small amount of light 14 polarized along the reject axis of polarizer 16. This situation exists in certain integrated optic circuit 16 modulators 11 and 12, as illustrated in FIG. 1 that is not dimensionally to scale. For a proton-exchange LiNbO$_3$ modulator 11 or 12, the remaining reject axis light 17 is essentially unmodulated in phase since it takes a different physical path through chip 16, than light 13 which goes through the modulating pass axis. Waveguide 18 only guides one polarization of light that is light 13. The leakage of the other polarization state of the light through chip 16 is due to scattered light 17, which bypasses phase modulators 11 and 12. Source 19 provides light 13 to integrated optic circuit (IOC) 16. Light returning from IOC 16 goes to detector 23 via coupler 21. Detector 13 converts a returned optical signal 34 into an electrical signal. This electrical signal goes to electronics 26. A bias generator 35 provides a bias modulation signal on line 37 to modulator 11 and electronics 26. The output of electronics 26 represents rotation rate of loop 15 and goes to a rate indicator 36. FIG. 1 has some numerical nomenclature common with that of FIG. 2.

Figure 2:
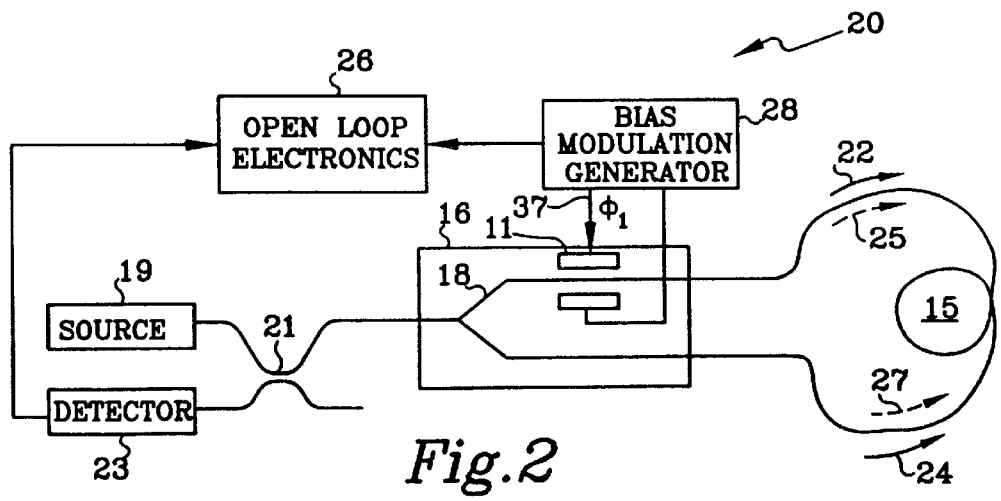
FIGS. 2, 3, 4 and 5 show a fiber optic gyroscope having an IOC with various modulator configurations.

FIG. 2 shows a simplified diagram of an open loop fiber optic gyroscope 20 having proton-exchange LiNbO$_3$ IOC 16 with a phase modulator 11 attached to one side of loop 15. Generator 28 with a bias modulation signal $\phi_1$ on line 37 drives modulator 11. A reference signal from generator 28 is provided to open loop electronics 26 for demodulation purposes. That side of loop 15 is where primary clockwise (CW) light wave 22 enters the loop. Primary counter-clockwise (CCW) light wave 24 enters the other side of loop 15. Spurious CW light waves 25 and spurious CCW light waves 27 pass through the polarizer 16 reject axis before entering loop 15. Further, spurious light waves 25 and 27 are not affected by phase modulator 11 whereas both primary waves 22 and 24 are. Wave 24 is affected upon exiting the loop. A well-known amplitude type error signal caused by the interference between primary CCW wave 24 and spurious CW wave 25 is canceled by an equal and opposite error caused by an interference between primary CW wave 22 and spurious CW wave 25. Because this polarization error is automatically suppressed by the modulation on one side of the loop, one does not need to carefully ensure that the spurious CW wave 25 interferes incoherently with primary waves 22 and 24. One can decorrelate spurious CCW wave 27 so that it interferes incoherently with primary waves 22 and 24, to suppress this polarization error.

Figure 3:
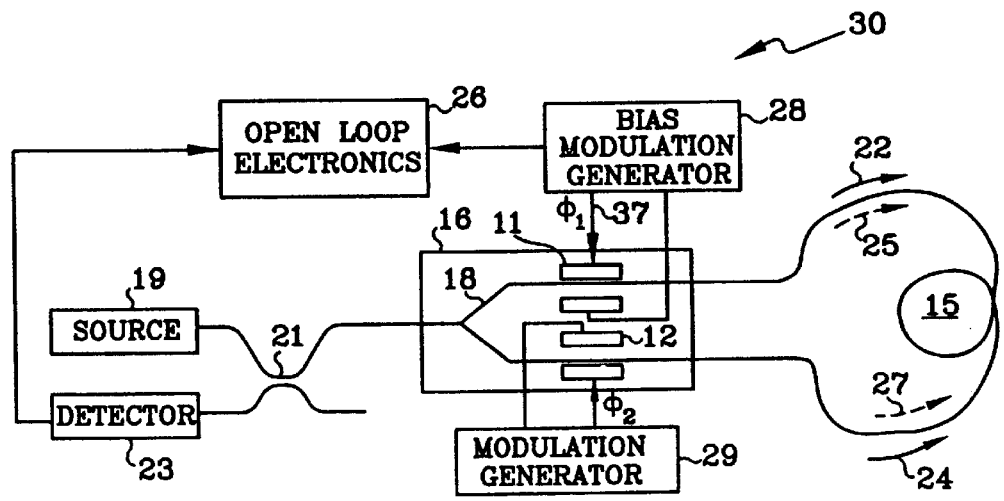

FIG. 3 shows a simplified diagram of an open loop fiber gyroscope 30 having IOC 16 with modulators 11 and 12 on both sides of loop 15, which are driven by generators 28 and 29, respectively. The bias modulation signal $\phi_1$ from generator 28 via line 37 is again applied to one side (i.e., modulator 11) of loop 15, which has the effect of suppressing the amplitude type errors associated with spurious CW wave 25. A second modulation signal $\phi_2$ from modulation generator 29 is applied to second phase modulator 12 on the CCW side of loop 15 to suppress the amplitude type polarization errors associated with spurious CCW wave 27 interfering with primary waves 22 and 24. Second modulation signal $\phi_2$ has frequency components that do not interfere with the sensor 30 operation. Further, second modulation signal $\phi_2$ meets the criteria that the average value of $\cos\phi_2 = 0$, where $\phi_2$ is the phase modulation impressed upon the light polarized along the pass axis of the polarizer of IOC 16 by second modulator 12. $\phi_2$ may, for example, be a sine wave, a triangle wave, or a saw tooth wave of the correct amplitude to suppress amplitude type polarization errors associated with spurious CCW wave 27 interfering with primary waves 22 and 24.

Figure 4:
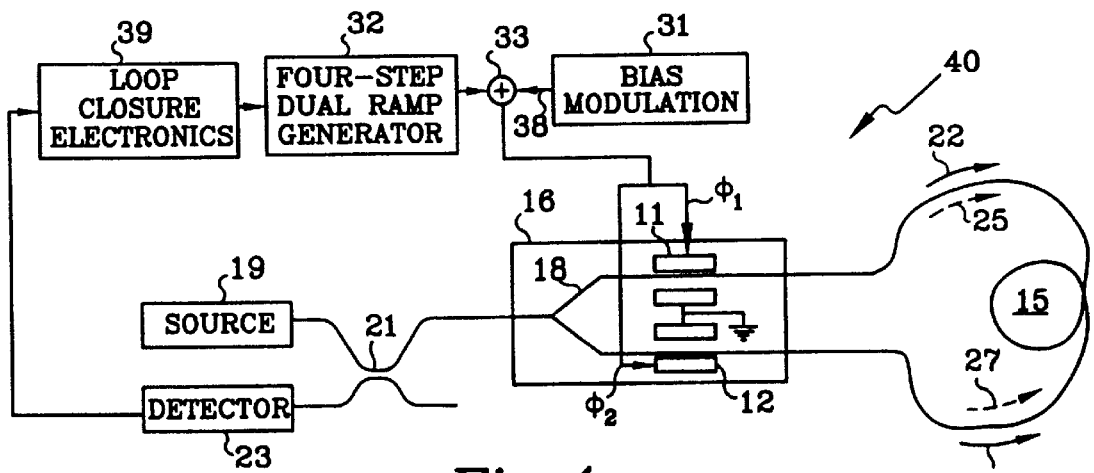

FIG. 4 shows a simplified diagram of a closed-loop fiber optic gyroscope 40. IOC 16 has modulator 11 on the CW side of loop 15 and modulator 12 on the CCW side of the loop. A bias modulation signal on line 38 via summer 33 from generator 31 is applied to modulators 11 and 12. Alternatively, a bias modulation signal can be applied to only one of the modulators on IOC 16. A closed-loop, ramp-like signal $\phi_2$ from generator 32 via summer 33 is also applied to modulators 11 and 12. The signal applied to modulator 11 is $\phi_1$ and the signal applied to modulator 12 is $\phi_2$. The closed-loop signal magnitudes are set by loop closure electronics 39, which are determined by an electrical signal from detector 23. Detector 23 receives light returning from loop 15 via IOC 16. Rotation of loop 15 about an axis perpendicular to a plane parallel with the fiber loop winding, results in phase shifts between primary waves 22 and 24. Interference between the phase-shifted primary waves is detected and passed on as a signal to electronics 39, ramp generator 32, and to modulators 11 and 12. This feedback signal tends to bring primary waves 22 and 24 back into phase with each other, during rotation. The amount of this feedback signal is an indication of rotation rate of loop 15. However, the interference of light at detector 23 may partially be the result of spurious waves. Thus, the signal to electronics 39, ramp generator 32, and modulators 11 and 12 may be erroneous and result in inaccurate rotation rate indications. Such inaccurate indications are due to polarization cross-coupling.

The waveforms of bias modulation signal waveform and the closed loop signal are composed of digital steps, with the time duration of each step equal to the transit time of the light around loop 15. Signals $\phi_1$ and $\phi_2$ are functions of time and meet the following criteria:

$$E\{\sin(\phi_m)*[\cos(\phi_2+\phi_m+\psi)+\cos(\phi_2+\psi)]\}=0$$

and $$E\{\sin(\phi_m)*[\cos(\phi_1-\phi_m\gamma)+\cos(\phi_1+\gamma)]\}=0,$$

where $$\phi_m=\phi_1(t)-\phi_1(t+\tau)+\phi_2(t+\tau)-\phi_2(t)$$

is the total phase difference modulation impressed by the modulators between the counter-propagating primary waves, and $\psi$ and $\gamma$ are arbitrary phase angles. E{ } represents the average (or expected) value of the enclosed waveform. The averaging time is one period of the loop closure.

One embodiment of this system 40 may have a closed-loop waveform that is a four-step dual ramp waveform. An alternative for the closed-loop signal is a dual serrodyne system where separate serrodyne waveforms are applied to modulators 11 and 12, respectively. Another alternative is to use any kind of closed-loop signal, and then further add waveforms composed of non-interfering frequency components that meet the above noted criteria.

In general, modulation techniques to suppress polarization error have the following criteria:

$$E\{\sin(\phi_m)*[\cos(\phi_{2x}-\phi_{2y}+\phi_m+\gamma)+\cos(\phi_{2x}-\phi_{2y}+\gamma)]\}=0$$

and $$E\{\sin(\phi_m)*[\cos(\phi_{1x}-\phi_{1y}-\phi_m+\psi)+\cos(\phi_{1x}-\phi_{1y}+\psi)]\}=0,$$

where the subscripts x and y have been added to denote the phase modulation signals supplied to light propagating in the x and y (i.e., primary and spurious) axes of the light on either side of the chip 16.

More specifically, on e may use co-propagating polarization errors to cancel counter-propagating polarization errors. This approach is possible when the phase modulation affects the primary and spurious polarization paths differently. The criteria to be met here are:

$$E\{\sin(\phi_m)*[\cos(\phi_{2x}-\phi_{2y}+\phi_m+\gamma)]\}=-E\{\sin(\phi_m)*[\cos(\phi_{2x}-\phi_{2y}+\gamma)]\}$$

and $$E\{\sin(\phi_m)*[\cos(\phi_{1x}-\phi_{1y}-\phi_m+\psi)]\}=-E\{\sin(\phi_m)*[\cos(\phi_{1x}-\phi_{1y}+\psi)]\}.$$

Figure 5:
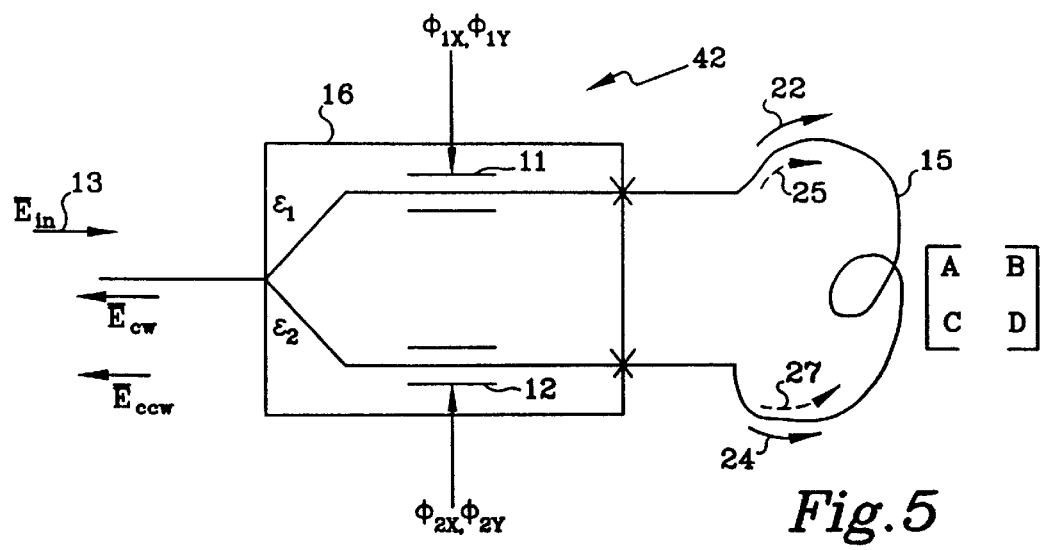

The relationship of the $\bar{E}_{in}$ (which is an input light waveform) to $\bar{E}_{cw}$ (which is the light exiting the loop having propagated around in the clockwise direction) in the sensing loop of the gyroscope, is shown by the following Jones matrices. FIG. 5 shows the inputs for $\phi_{1x}(t)$ and to $\phi_{1y}(t)$ to modulator 11 and inputs $\phi_{2x}(t)$ and $\phi_{2y}(t)$ to modulator 12.

$$\bar{E}_{cw} = k \begin{bmatrix} e^{j\phi_{2x}(t+\tau)} & 0 \\ 0 & \epsilon_2 e^{j\phi_{2y}(t+\tau)} \end{bmatrix} \begin{bmatrix} A & B \\ C & D \end{bmatrix} \begin{bmatrix} e^{j\phi_{1x}(t)} & 0 \\ 0 & \epsilon_1 e^{j\phi_{1y}(t)} \end{bmatrix} \bar{E}_{in}$$

where:

$\phi_{1x}$=phase modulation signal applied to the x (pass) polarized component by modulator 11.
$\phi_{2x}$=phase modulation signal applied to the x (pass) polarized component by modulator 12.
$\phi_{1y}$=phase modulation signal applied to the y (reject) polarized component by modulator 11.
$\phi_{2y}$=phase modulation signal applied to the y (reject) polarized component by modulator 12.
$\tau$=loop propagation delay time
k=constant, including loss for polarization independent loss and phase shift.
$\epsilon_1$=polarization extinction ratio for the modulator 11 side of integrated circuit 16.
$\epsilon_2$=polarization extinction ratio for the modulator 12 side of integrated circuit 16.

$\begin{bmatrix} A & B \\ C & D \end{bmatrix}$ = Jones matrix describing the polarization state evolution of the light throough the loop.

A=the change of the amount of light in clockwise wave 22 in the x (pass) polarization axis over the length of fiber in sensing coil 15.
B=the amount of light in clockwise wave 25 in the y (reject) polarization axis cross-coupled over the length of fiber in sensing coil 15 to clockwise wave 22 in the x (pass) polarization axis.
C=the amount of light in clockwise wave 22 in the x (pass) polarization axis cross-coupled over the length of fiber in sensing coil 15 to clockwise wave 25 in the y (reject) polarization axis.
D=the change of the amount of light in clockwise wave 25 in the y (reject) polarization axis over the length of fiber in sensing coil 15.

$$\Rightarrow \bar{E}_{cw} = k \begin{bmatrix} Ae^{j[\phi_{1x}(t)+\phi_{2x}(t+\tau)]} & \epsilon_1 Be^{j[\phi_{1y}(t)+\phi_{2x}(t+\tau)]} \\ \epsilon_2 Ce^{j[\phi_{1x}(t)+\phi_{2y}(t+\tau)]} & \epsilon_1 \epsilon_2 De^{j[\phi_{1y}(t)+\phi_{2y}(t+\tau)]} \end{bmatrix} \bar{E}_{in}$$

From the above, the relationships of the input waveform ($\bar{E}_{in}$) to the counterclockwise propagating light waveform ($\bar{E}_{ccw}$) is:

$$\Rightarrow \bar{E}_{ccw} =$$
$$k \begin{bmatrix} e^{j\phi_{1x}(t+\tau)} & 0 \\ 0 & \epsilon_1 e^{j\phi_{1y}(t+\tau)} \end{bmatrix} \begin{bmatrix} A & -C \\ -B & D \end{bmatrix} \begin{bmatrix} e^{j\phi_{2x}(t)} & 0 \\ 0 & \epsilon_2 e^{j\phi_{2y}(t)} \end{bmatrix} \bar{E}_{in} e^{j\phi_R}$$

$$\Rightarrow \bar{E}_{ccw} = k \begin{bmatrix} Ae^{j[\phi_{2x}(t)+\phi_{1x}(t+\tau)]} & -\epsilon_2 Ce^{j[\phi_{2y}(t)+\phi_{1x}(t+\tau)]} \\ -\epsilon_1 Be^{j[\phi_{2x}(t)+\phi_{1y}(t+\tau)]} & \epsilon_1 \epsilon_2 De^{j[\phi_{2y}(t)+\phi_{1y}(t+\tau)]} \end{bmatrix} \bar{E}_{in} e^{j\phi_R}$$

where $$\phi_R = \frac{2\pi LD}{\lambda c}\Omega$$

is the Sagnac phase shift, all incorporated into the ccw wave. L is the length of the sensing loop fiber, D is the diameter of the loop, $\lambda$ is the light wavelength, c is the speed of light and $\Omega$ is the rate of rotation.

Next one defines $\bar{E}_{out}=\bar{E}_{cw}+\bar{E}_{ccw}$ and $I_{out}=|\bar{E}_{out}|^2$ where $I_{out}$ is the intensity of the light exiting the loop. Keeping terms only to first order in $\epsilon$, one finds by taking $$\bar{E}_{in} = \begin{bmatrix} E_{inx} \\ E_{iny} \end{bmatrix}$$

and $I_{inx}|E_{inx}|^2$, $$I_{out}=k^2|A|^2 I_{inx}[2+2\cos[\phi_{1x}(t)-\phi_{1x}(t+\tau)+\phi_{2x}(t+\tau)-\phi_{2x}(t)-\phi_R]]$$

+4 error terms.
The first error term, Error 1, is:

$$k^2\epsilon_1 AB^* E_{inx} E_{iny}^* e^{j[\phi_{1x}(t)-\phi_{1y}(t)]}+c.c.$$

*[This term is due to the interference between the cw main beam and the cw spurious beam (or beams).] If modulation of both polarization modes is the same, i.e., $\phi_{1x}=\phi_{1y}$, then the error is unmodulated and outside the modulation bandwidth.
The second error term, Error 2, is:

$$k^2\epsilon_1 AB^* E_{inx} E_{iny}^* e^{j[\phi_{2x}(t)-\phi_{2x}(t+\tau)-\phi_{1y}(t)+\phi_{1x}(t+\tau)+\phi_R]}+c.c.$$

*[This term is due to the interference between the ccw main beam and the cw spurious beam (or beams).] This error is one of the two main amplitude type polarization errors.
The third error term, Error 3, is:

$$k^2\epsilon_2 AC^* E_{inx} E_{iny}^* e^{j[\phi_{1x}(t)-\phi_{1x}(t+\tau)+\phi_{2x}(t+\tau)-\phi_{2y}(t)-\phi_R]}+c.c.$$

*[This term is due to the interference between the cw main beam and the ccw spurious beam (or beams).] This error is the other of the two main amplitude type polarization errors.
The fourth error term, Error 4, is:

$$k^2\epsilon_2 AC^* E_{inx} E_{iny}^* e^{j[\phi_{2x}(t)-\phi_{2y}(t)]}+c.c.$$

*[This term is due to the interference between the ccw main beam and the ccw spurious beam (or beams).] As in the case of the first error, it is not a factor if $\phi_{2x}=\phi_{2y}$, i.e., there is no birefringence modulation.

The sum of Error 1 and Error 2 can be set to zero.

Now, one defines $k^2AB^*E_{inx}E_{iny} \equiv Re^{j\psi}$

Error $1 = 2\epsilon_1 R \cos[\phi_{1x}(t) - \phi_{1y}(t) + \psi]$

Error $2 = 2\epsilon_1 R \cos[\phi_{2x}(t) - \phi_{1y}(t) + \phi_{1x}(t+\tau) - \phi_{2x}(t+\tau) + \phi_R + \psi]$ Error 1 can cancel Error 2 if the modulation waveforms are chosen correctly.

The general criterion includes:

$$\{\cos[\phi_{1x}(t) - \phi_{1y}(t) + \psi] + \cos[\overline{\phi_{2x}(t) - \phi_{1y}(t) + \phi_{1x}(t+\tau) - \phi_{2x}(t+\tau)}^{\phi_{1x}(t)-\phi_m(t)-\phi_{1y}(t)} + \psi]\} \cdot D_S = R_N$$

where $D_S$ is a demodulation signal and $R_N$ is the null result. Here, $\phi_R$ is dropped from Error 2 because it is normally very small.

One may simplify with $\phi_y=0$ (in the case for proton-exchange IOC's) to get:

$\{\cos[\phi_{1x}(t)+\psi]+\cos[\phi_{2x}(t)-\phi_{2x}(t+\tau)+\phi_{1x}(t+\tau)+\psi]\}\cdot D_S=R_N$ Next, one defines $\phi_m(t) \equiv \phi_{1x}(t) - \phi_{1x}(t+\tau) + \phi_{2x}(t+\tau) - \phi_{2x}(t)\ \phi_m(t)$ is the total phase bias impressed on the main beams of the interferometer.

Error 1 plus Error 2 equals zero if:

$\{\cos[\phi_{1x}(t)+\psi]+\cos[\phi_{1x}(t)-\phi_m(t)+\psi]\}\cdot D_S=R_N.$

Now, the signal demodulation $D_S$ can often be represented by a multiplication of $\sin[\phi_m(t)]$ followed by a low pass filter.

$<\sin[\phi_m(t)]\cos[\phi_{1x}(t)+\psi]+\sin[\phi_m(t)]\cos[\phi_{1x}(t)=\phi_m(t)+\psi]>=0$ where $<\cdot>$ represents a time average, and $\psi$ can vary. Considering that $\psi$ can vary, the requirement becomes:

$<\sin[\phi_m(t)]\cos[\phi_{1x}(t)]+\sin[\phi_m(t)]\cos[\phi_{1x}(t)-\phi_m(t)]>=0;$ and $<\sin[\phi_m(t)]\sin[\phi_{1x}(t)]+\sin[\phi_m(t)]\sin[\phi_{1x}(t)-\phi_m(t)]>=0.$ Several contentions made here are: carrier suppression $\phi_{1x}(t)$ is dithered to make all the terms individually average to zero; co-propagating errors cancel counter-propagating errors meaning that individual terms do not average to zero, but sums do.

To further simplify with $$\phi_m(t) = \pm \frac{n\pi}{2},$$

and n is an odd integer, then Errors 1 and 2 are:

$<\sin[\phi_m(t)]\cos[\phi_{1x}(t)]+\sin[\phi_{1x}(t)]>=0$ $<\sin[\phi_m(t)]\sin[\phi_{1x}(t)]-\cos[\phi_{1x}(t)]>=0$ Next, one looks to the sum of Error 3 and Error 4 as being zero.

Define $k^2AC^*E_{inx}E_{iny} \equiv Se^{j\gamma}$

Error $3=2\epsilon_2 S \cos[\phi_{1x}(t)-\phi_{1x}(t+\tau)+\phi_{2x}(t+\tau)-\phi_{2y}(t)-\phi_R=\gamma]$ Error $4=2\epsilon_2 S \cos[\phi_{2x}(t)-\phi_{2y}(t)+\gamma]$ The general criterion for error cancellation is $\{\cos[\phi_{1x}(t)-\phi_{1x}(t+\tau)+\phi_{2x}(t+\tau)-\phi_{2y}(t)+\gamma]=\cos[\phi_{2x}(t)-\phi_{2y}(t)+\gamma]]\}\cdot D_S=R_N$ Again, $\phi_R$ is dropped because it is normally very small. One may simplify using $\phi_y=0$ and the $\phi_m(t)$ definition. The sum of Error 3 and Error 4 is zero if:

$\{\cos[\phi_m(t)+\phi_{2x}+\gamma]+\cos[\phi_{2x}(t)+\gamma]\}D_S=R_N.$

Again demodulating, using $\sin[\phi_m(t)]$ and low pass filtering, the sum of Error 3 and Error 4 equals zero if:

$<\cos[\phi_m(t)+\phi_{2x}(t)+\gamma]\sin[\phi_m(t)]+\cos[\phi_{2x}(t)+\gamma]\sin[\phi_m(t)]>=0,$ which is a general $\gamma$ equation which leads to the following two equations without $\gamma$.

$<\sin[\phi_m(t)]\cos[\phi_m(t)+\phi_{2x}(t)]+\sin[\phi_m(t)]\cos[\phi_{2x}(t)]>=0$ $<\sin[\phi_m(t)]\sin[\phi_m(t)+\phi_{2x}(t)]+\sin[\phi_m(t)]\sin[\phi_{2x}(t)]>=0$ Again, the same contentions can be made as described above.

Figure 6A:
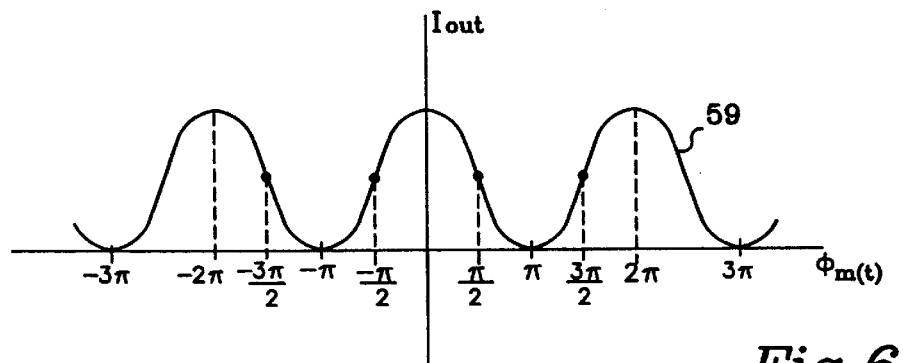
FIGS. 6a, 6b and 6c show an interferogram, a bias modulation signal, and a waveform for a two-step dual ramp closed loop fiber optic gyroscope, respectively.
Figure 6B:
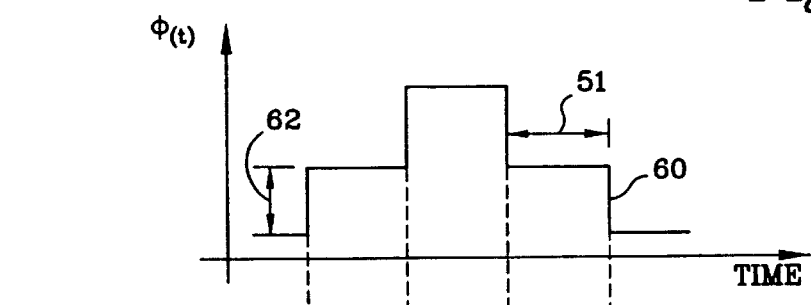
Figure 6C:
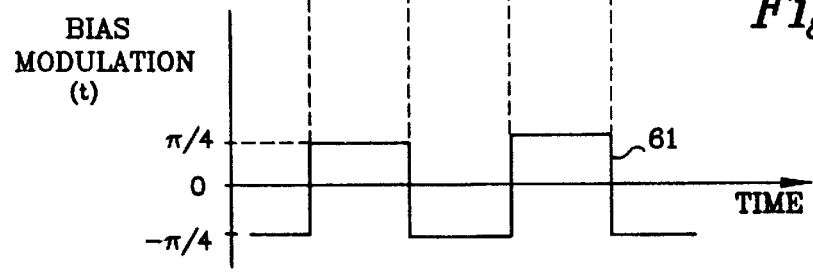

Further, taking $$\phi_m(t) = \pm \frac{n\pi}{2}$$

and n as an odd integer, as is common, the criteria become:

$<\sin[\phi_m(t)]\cos[\phi_{2x}(t)]-\sin[\phi_{2x}(t)]>=0$ $<\sin[\phi_m(t)]\sin[\phi_{2x}(t)]-\cos[\phi_{2x}(t)]>=0$ FIGS. 6a, 6b and 6c show the waveforms 59, 60 and 61, respectively, for a dual ramp closed loop fiber optic gyroscope. Waveform 59 is an interferogram of $I_{OUT}$ versus $\phi_m(t)$. Bias modulation signal 61 incorporated in $\phi_{1x}$ is applied to modulator 11 of gyroscope 42 of FIG. 5. Dual ramp signal 60 is split between $\phi_{1x}$ and $\phi_{2x}$ which go to modulators 11 and 12, respectively. Dimension 62 of waveform 60 is $\pi$. Dimension 51 is $\tau$. This input configuration is a push-pull operation. Bias modulation 61 is at the proper frequency and is a square wave. The following table describes the various signals for the two-step dual ramp system.

| Time Interval | $[0,\tau]$ | $[\tau,2\tau]$ | $[2\tau,3\tau]$ | $[3\tau,4\tau]$ |
|---|---|---|---|---|
| $\phi_{Bias}$ | $\pi/4$ | $-\pi/4$ | $\pi/4$ | $-\pi/4$ |
| $1/2\phi_{Dual\ Ramp}$ | 0 | $\pi/2$ | $\pi$ | $\pi/2$ |
| $\phi_{1x}$ | $\pi/4$ | $\pi/4$ | $5\pi/4$ | $\pi/4$ |
| $\phi_{2x}$ | 0 | $-\pi/2$ | $-\pi$ | $-\pi/2$ |
| $\phi_m$ | $-\pi/2$ | $\frac{3\pi}{2}$ | $\frac{3\pi}{2}$ | $\pi/2$ |

$\phi_m = \phi_{1x}(t) - \phi_{1x}(t+\psi) + \phi_{2x}(t+\tau) - \phi_{2x}(t)$

From above, criteria are examined for the sum of Error 1 and Error 2 equal to zero, for the two-step dual ramp.

$\langle \sin[\phi_m(t)]\cos[\phi_{1x}(t)] + \sin[\phi_{1x}(t)]\rangle = 0$ $\Rightarrow \langle -1\cdot\frac{\sqrt{2}}{2}+1\cdot\frac{\sqrt{2}}{2}-1\cdot\left(-\frac{\sqrt{2}}{2}\right)+1\frac{\sqrt{2}}{2}\rangle = \sqrt{2}/4$ $\Rightarrow \langle +\frac{\sqrt{2}}{2}+\frac{\sqrt{2}}{2}-\frac{\sqrt{2}}{2}+\frac{\sqrt{2}}{2}\rangle = \sqrt{2}/4$ Both terms average to $\sqrt{2}/4$. These errors are not canceled.

$\langle \sin[\phi_m(t)]\sin[\phi_{1x}(t)] - \cos[\phi_{1x}(t)]\rangle = 0$ $\Rightarrow \langle -1\cdot\frac{\sqrt{2}}{2}+1\cdot\frac{\sqrt{2}}{2}-1\cdot\frac{-\sqrt{2}}{2}+1\frac{\sqrt{2}}{2}\rangle = \sqrt{2}/4$ $\Rightarrow -\langle +\frac{\sqrt{2}}{2}+\frac{\sqrt{2}}{2}-\frac{\sqrt{2}}{2}+\frac{\sqrt{2}}{2}\rangle = -\sqrt{2}/4$ Thus, this criterion is satisfied for Errors 1 and 2. From above, criteria for Errors 3 and 4 equal to zero, are examined.

$<\sin[\phi_m(t)\cos[\phi_{2x}(t)]-\sin[\phi_{2x}(t)]>=0$ $\rightarrow <-1\cdot1+\cdot0-1\cdot-1+1\cdot0>=0$     First Term $\rightarrow -<0-1+0-1>=\frac{1}{2}$     Second Term The latter error is not canceled.

$<\sin[\phi_m(t)]\sin[\phi_{2x}(t)]+\cos[\phi_{2x}(t)]>=0$ $\rightarrow <-1\cdot0+1\cdot-1-1\cdot0+1\cdot-1>=-\frac{1}{2}$     First Term $\rightarrow <1+0-1+0>=0$     Second Term This error is not cancelled. The conclusion is that the two-step dual ramp does not meet the above noted criteria for the punch-pull configuration.

Figure 7A:
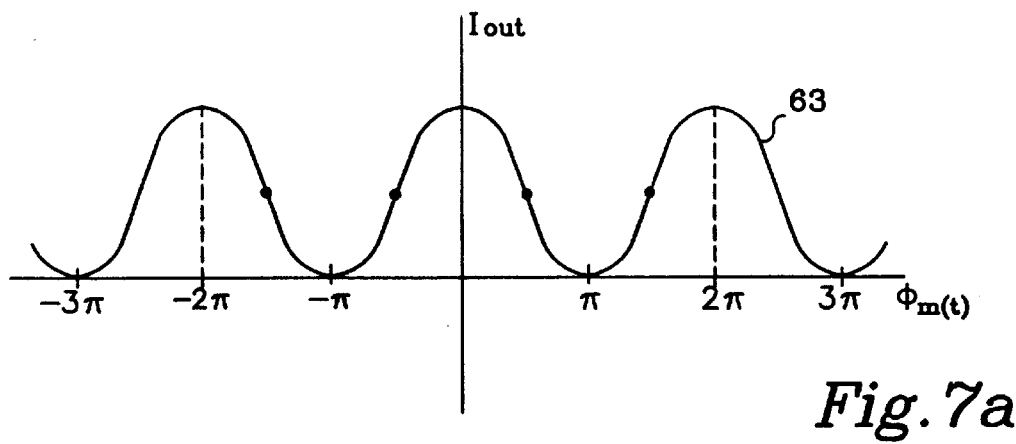
FIGS. 7a, 7b and 7c show an interferogram, a bias modulation signal and a waveform for a four-step dual ramp closed loop fiber optic gyroscope, respectively.
Figure 7B:
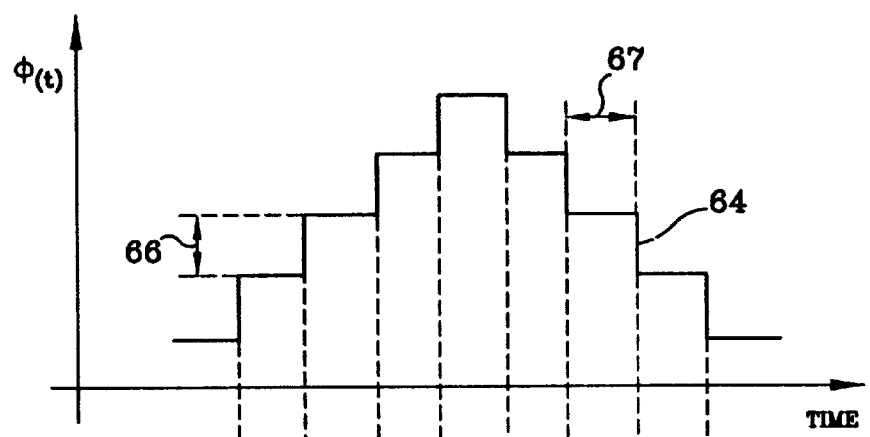
Figure 7C:
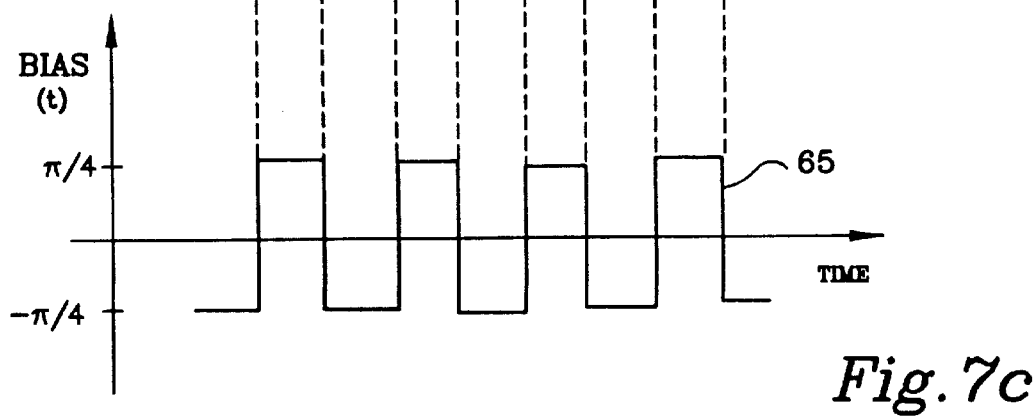

FIGS. 7a, 7b and 7c show waveforms 63, 64 and 65, respectively, for a four-step dual ramp closed loop gyroscope. Waveform 63 is an interferogram of $I_{OUT}$ versus $\phi_m(t)$ Bias modulation signal 65 incorporated in $\phi_{1x}$ is applied to modulator 11 of FIG. 5. Dual ramp signal 64 is split between $\phi_{1x}$ and $\phi_{x2}$ going to modulators 11 and 12, respectively. Dimension 66 of waveform 64 is $\pi$. Dimension 67 is $\tau$. This is a push-pull operation. Bias modulation is a square wave 65 at the proper frequency. The following table describes the various signals for the four-step dual ramp system.

| $\phi_{Bias}$ | $\pi/4$ | $-\pi/4$ | $\pi/4$ | $-\pi/4$ | $\pi/4$ | $-\pi/4$ | $\pi/4$ | $-\pi/4$ |
|---|---|---|---|---|---|---|---|---|
| $\frac{1}{2}\phi_{Dual\ Ramp}$ | 0 | $\pi/2$ | $\pi$ | $3\pi/2$ | $2\pi$ | $3\pi/2$ | $\pi$ | $\pi/2$ |
| $\phi_{1x}(t)$ | $\pi/4$ | $\pi/4$ | $5\pi/4$ | $5\pi/4$ | $9\pi/4$ | $5\pi/4$ | $5\pi/4$ | $\pi/4$ |
| $\phi_{2x}(t)$ | 0 | $-\pi/2$ | $-\pi$ | $-3\pi/2$ | $-2\pi$ | $-3\pi/2$ | $-\pi$ | $-\pi/2$ |
| $\phi_m(t)$ | $-\pi/2$ | $-3\pi/2$ | $-\pi/2$ | $-3\pi/2$ | $3\pi/2$ | $\pi/2$ | $3\pi/2$ | $+\pi/2$ |

$\phi_m = \phi_{1x}(t) - \phi_{1x}(t+\tau) + \phi_{2x}(t+\tau) - \phi_{2x}(t)$

The criteria for the sum of Error 1 and Error 2 equal to zero, are examined for the four-step dual ramp.

$<\sin \phi_m(t)\cos \phi_{1x}(t)+\sin \phi_{1x}(t)>=0$ $\langle \sin\phi_m(t)\cos\phi_{1x}(t) + \sin\phi_{1x}(t)\rangle = 0$ $\langle -1\cdot\frac{\sqrt{2}}{2}+1\cdot\frac{\sqrt{2}}{2}-1\cdot\frac{-\sqrt{2}}{2}+1\cdot\frac{-\sqrt{2}}{2}-$ -continued $1\cdot\frac{\sqrt{2}}{2}+1\cdot\frac{-\sqrt{2}}{2}-1\cdot\frac{-\sqrt{2}}{2}+1\cdot\frac{\sqrt{2}}{2}\rangle = 0$ First Term $\langle\frac{\sqrt{2}}{2}+\frac{\sqrt{2}}{2}-\frac{\sqrt{2}}{2}-\frac{\sqrt{2}}{2}+\frac{\sqrt{2}}{2}-\frac{\sqrt{2}}{2}-\frac{\sqrt{2}}{2}+\frac{\sqrt{2}}{2}\rangle = 0$ Second Term $\langle \sin\phi_m(t)\sin\phi_{1x}(t) - \cos\phi_{1x}(t)\rangle = 0$ $\langle -1\cdot\frac{\sqrt{2}}{2}+1\cdot\frac{\sqrt{2}}{2}-1\cdot\frac{-\sqrt{2}}{2}+1\cdot\frac{-\sqrt{2}}{2}-$ $1\cdot\frac{\sqrt{2}}{2}+1\cdot\frac{-\sqrt{2}}{2}-1\cdot\frac{-\sqrt{2}}{2}+1\cdot\frac{\sqrt{2}}{2}\rangle = 0$ First Term $-\langle\frac{\sqrt{2}}{2}+\frac{\sqrt{2}}{2}-\frac{\sqrt{2}}{2}-\frac{\sqrt{2}}{2}+\frac{\sqrt{2}}{2}-\frac{\sqrt{2}}{2}-\frac{\sqrt{2}}{2}+\frac{\sqrt{2}}{2}\rangle =$ $0$ Second Term Errors 1 and 2 are individually equal to zero.

The criteria for the sum of Error 3 and Error 4 equal to zero, are examined for the four-step dual ramp.

$<\sin \phi_m(t)\cos \phi_{2x}(t)-\sin \phi_{2x}(t)>=0$ $<-1\cdot1+1\cdot0-1\cdot-1+1\cdot0-1\cdot1+1\cdot0-1\cdot-1+1\cdot0>=0$     First Term $-<0-1+0+1+0+1+0-1>=0$     Second Term $<\sin \phi_m(t)\sin \phi_{2x}(t)+\cos \phi_{2x}(t)>=0$ $<-1\cdot0+1\cdot-1-1\cdot+1+1\cdot-1\cdot0+1\cdot+1-1\cdot0+1\cdot-1>=0$     First Term $<1+0-1+0+1+0-1+0>=0$     Second Term Error 3 and Error 4 are individually zero. The four-step dual ramp is a case where all four errors individually are modulated to zero, (with a $\pi/2$ bias modulation depth).

Open loop operation is looked at in conjunction with just modulator 11. A bias modulation is incorporated in $\phi_1$ which is applied to modulation 11. The bias modulation is at the proper frequency.

$\rightarrow\phi_m=2\phi_1$

The criteria from above, for the sum of Errors 1 and 2 equal to zero, are examined.

$<\sin \phi_m \cos \phi_1+\sin \phi_m \cos(\phi_1-\phi_m)>=0$ $\rightarrow <\sin 2\phi_1 \cos \phi_1+\sin 2\phi_1 \cos \phi_1>$ $=2<\sin 2\phi_1 \cos \phi_1>=0$ This is an odd function.

$<\sin \phi_m \sin \phi_1+\sin \phi_m \sin(\phi_1-\phi_m)>=0$ $\rightarrow <\sin 2\phi_1 \sin \phi_1+\sin \phi_m \sin(-\phi_1)>=0$ Here co-propagating Error 1 cancels counter-propagating Error 2.

Criteria from above, for the sum of Errors 3 and 4 equal to zero, are examined.

$<\sin \phi_m \cos(\phi_m+\phi_2)+\sin \phi_m \cos \phi_2>=0$ $\phi_2=0$ $\rightarrow <\sin \phi_m \cos \phi_m + \sin \phi_m> = 0$ This is an odd function.

$<\sin \phi_m \sin(\phi_m+\phi_2)+\sin \phi_m \sin \phi_2> = 0$ $\rightarrow <\sin^2 \phi_m> \neq 0$ In sum, Error 3 is not equal to zero, but Error 4 is equal to zero. So one only needs to gamma trim Error 3.

The next example involves an open loop configuration with carrier suppression applied to modulator 12. $\phi_1$ includes bias modulation at the proper frequency, which is applied to modulator 11. The low frequency carrier suppression signal is incorporated in the $\phi_2$ signal that is applied to modulator 12, where $\phi_2 = <\cos(\phi_2+\psi)> = 0$ is assumed satisfied, $\rightarrow \phi_m \approx 2\phi_1$ and $\phi_2$ is asynchronous with $\phi_1$, and $\rightarrow <\cos(\phi_1+\gamma)\cos(\phi_2+\psi)> = 0$ for all $\psi$ and $\gamma$.

The criteria from above for the sum of Errors 1 and 2 equal to zero, are examined and found to be equal to zero for same reasoning as the previous open loop example utilizing modulator 11.

The criteria from above for the sum of Errors 3 and 4 equal to zero are examined.

$<\sin \phi_m \cos(\phi_m+\phi_2)+\sin \phi_m \cos \phi_2> = 0$ because $\phi_2$ is asynchronous with $\phi_1$.

$<\sin \phi_m \sin(\phi_m+\phi_2)+\sin \phi_m \sin \phi_2> = 0$ because $\phi_2$ is asynchronous with $\phi_1$.
The sum of Errors 3 and 4 is found to be equal to zero.

Figure 8:
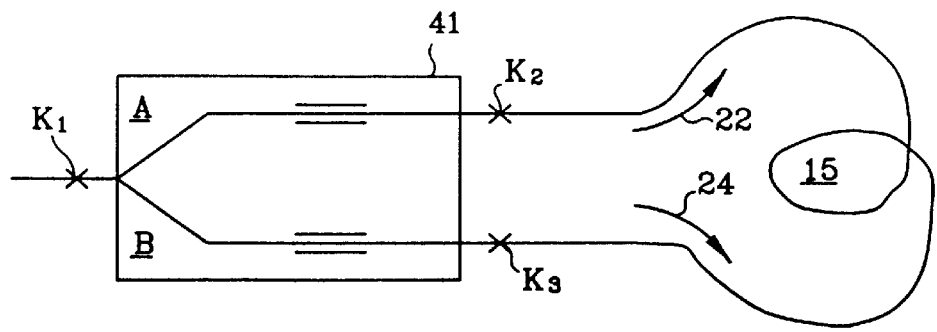
FIG. 8 is a diagram of the IOC with a light splitter for error classification.

The present invention achieves optimal implementations of polarization error suppression in open and closed loop fiber optic gyroscope systems using serrodyne (or digital phase step) or dual ramp. (An optimal implementation for a four-step dual ramp is described elsewhere of this description.) As noted above, fiber optic gyroscopes may have polarization errors. The polarization errors can be classified as amplitude-type or intensity-type errors. The amplitude-type polarization errors involve interference of cross-coupled waves and a primary wave. Cross-coupled waves may be referred to as spurious or secondary waves. The primary waves are transmitted through the pass axis of the polarizer. The secondary waves are transmitted in the reject axis of the polarizer. The intensity-type polarization errors involve interference of two cross-coupled waves. Further, error classification may be done in conjunction with FIG. 8. There are amplitude-type polarization errors associated with side A of IOC 41. These errors involve interferences between waves cross-coupled at points $k_1$ and $k_2$ and a primary wave. Error 1 involves co-propagating waves and error 2 involves counter-propagating waves. Also, there are amplitude-type polarization errors associated with side B of IOC 41. The errors involve interferences between waves cross-coupled at points $k_1$ and $k_3$ and a primary wave. Error 3 involves counter-propagating waves. Error 4 involves co-propagating waves. Finally, there are intensity-type polarization errors, which are identified as error 5. Error 5 involves interferences between two waves cross-coupled at points $k_2$ and $k_3$ both of which are located within the gyroscope loop. Errors 1, 2, 3, 4 and 5 may be also referred to types one, two, three, four and five polarization errors, respectively.

Figure 9A:
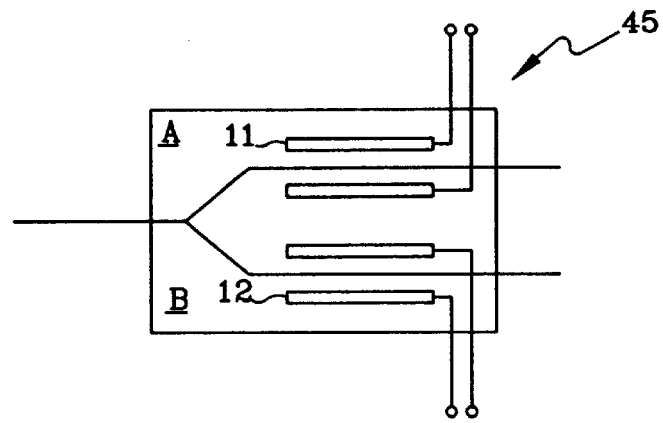
FIG. 9a shows the modulator layout for the IOC of FIG. 8.
Figure 9B:
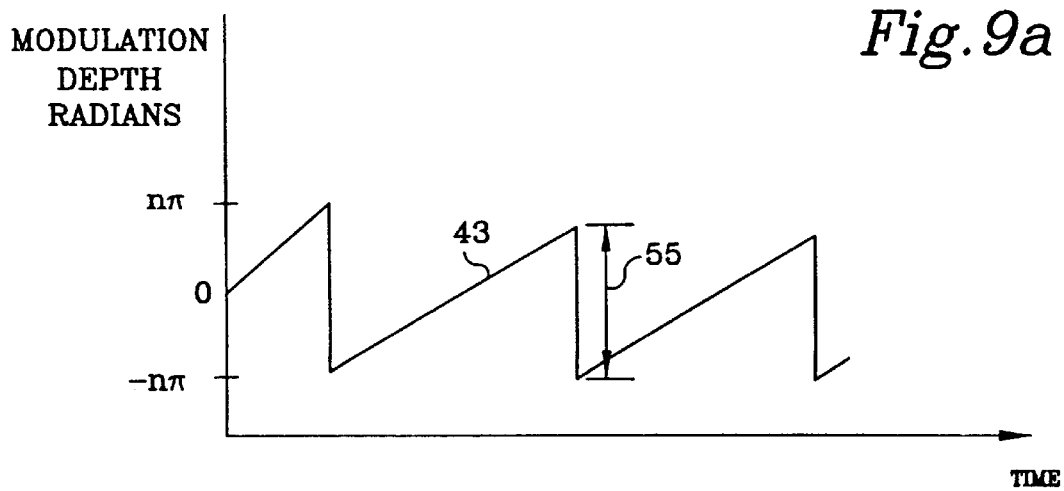
FIG. 9b shows a serrodyne loop-closure signal.

There is an optimal implementation of a serrodyne loop closure to suppress or cancel polarization errors. A bias modulation signal is applied to modulator 11 of IOC 45 and the serrodyne signal 43 of FIG. 9b is applied to modulator 12 of FIG. 9a. FIG. 9b shows the serrodyne loop closure signal 43, lc(t), having a peak-to-peak amplitude 55 of phase modulation at $2\pi, 4\pi, \ldots, n2\pi$ radians, where n is an integer. Loop closure signals meet the criteria for suppression of polarization errors. That criterion is $<\cos(lc(t))> = 0$. The fact that this implementation is optimal is not known in the art. Signal 43 may instead be a digital phase step signal (i.e., a digitized serrodyne signal).

The amplitude polarization errors on the A-side experience self-cancellation, as errors 1 and 2 are equal in amplitude, but opposite in sign. The amplitude polarization errors on the B-side are suppressed by loop closure at non-zero rates. The intensity errors are suppressed by loop closure at non-zero rates. There are many errors associated with side A (or B) which form a class of errors. The present modulation techniques suppress all errors (or classes).

Figure 9C:
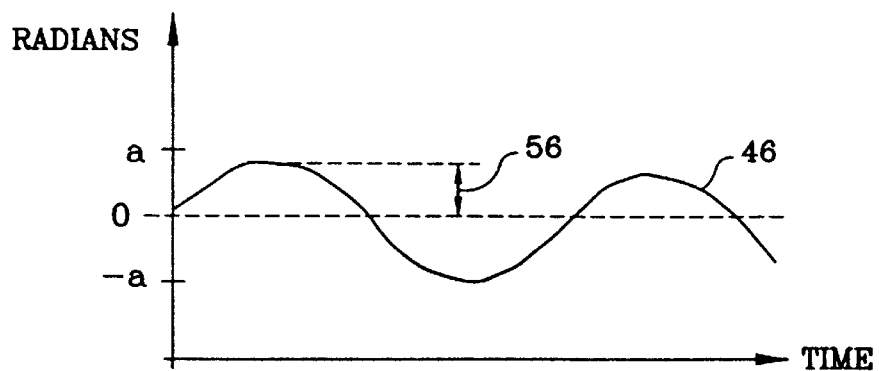
FIGS. 9c and 9d show examples of polarization error suppression waveforms.
Figure 9D:
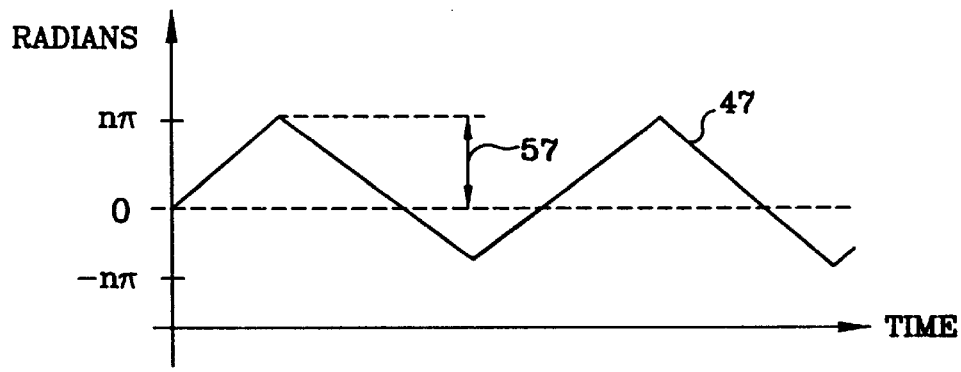
Figure 9E:
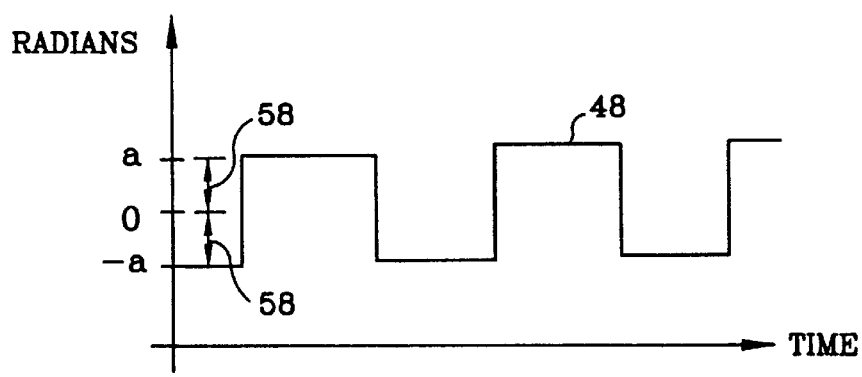
FIG. 9e is a polarization error suppression waveform invisible to loop closure for $\pi/2$ square wave bias modulation.

The following is a first instance of an optimal implementation of serrodyne loop closure with error suppression modulation. Serrodyne loop closure signal lc(t) is applied to modulator 11 and an error suppression modulation es(t) is applied to modulator 12. Bias modulation can be applied to either side. There are many waveforms, which satisfy condition for polarization error suppression $<\cos(es(t))> = 0$. Waveforms 46, 47 and 48 are illustrated in FIGS. 9c, 9d and 9e, respectively. The error suppression waveforms should have either low frequency or a frequency close to even multiples of the proper frequency of sensing loop 15. The proper or eigen frequency is equal to $1/2\tau$, where $\tau$ is the loop transit time.

In the description below, the frequency of error suppression waveforms is assumed to be low (substantially lower than the proper frequency). Loop closure reconstructs the shape of the error suppression modulation waveform, es(t), at low frequencies. Thus, error suppression modulation is applied to both modulators 11 and 12 of sides A and B, respectively, of IOC 45. The exception is a square wave 48 of FIG. 9e, which is invisible to loop closure for square wave bias modulation at a modulation depth 58 (i.e., a) of $\pi/2$, but provides suppression of polarization errors. Square wave 48 may have a peak amplitude 58 of $(2i+1)\pi/2$ where i is an integer equal to 0,1,2, . . . . If bias modulation is applied to side A (modulator 11), the amplitude polarization errors associated with this side experience self cancellation as errors 1 and 2 are equal in amplitude but different in sign. The amplitude polarization errors on the B-side (modulator 12) of IOC 45 are suppressed by error suppression modulation es(t) applied to modulator 12. Similarly, if bias modulation is applied to side B, the amplitude polarization errors associated with this side experience self cancellation; the errors associated with side A are suppressed by the waveform es(t) reconstructed by the loop closure. The intensity polarization errors are suppressed for non-zero rotation rates. For the square wave, the intensity errors are suppressed at all rotation rates including the zero rotation rate.

The following is a second instance of an optimal implementation of serrodyne loop closure with error suppression modulation. Bias modulation is applied to modulator 11 and a serrodyne loop closure, lc(t), and error suppression signal is applied to modulator 12 of IOC 45 of FIG. 9a. In this implementation, the error suppression waveforms are synthesized within the closed loop as error suppression modulation, es(t), and can take any form which satisfies equation <cos(es(t))>=0. Examples of optimal waveforms are shown in FIGS. 9c and 9d. The peak modulation depth of waveform 46 is about 2.4 radians wherein the Bessel function $J_o$ of this depth 56 (i.e., a) is 2.40483 radians where $J_o(a)=0$. Other zero points for the Bessel function are 5.52 and 8.65 radians. Peak-to-peak amplitude 57 of waveform 47 of FIG. 9d is n2π radians where n is an integer. Error suppression modulation and serrodyne loop closure signals, both of which are applied to side B electrodes, meet the polarization error suppression criteria:

<cos(lc(t))>=0

<cos(es(t))>=0.

Amplitude polarization errors arising on the A-side of IOC 45 experience self-cancellation. Amplitude polarization errors arising on the B side of the IOC are suppressed by loop closure signal lc(t) at non-zero rotation rates and error suppression modulation signal es(t) at all rotation rates, including the zero rate. The intensity polarization errors are suppressed by loop closure signal lc(t) at non-zero rotation rates and by error suppression modulation signal es(t) at all rotation rates, including the zero rotation rate. The above describes a preferred implementation of loop closure for serrodyne or digital phase step techniques. The triangular waveform 47 provides for suppression of backscatter errors in addition to the suppression of polarization errors.

Figure 10A:
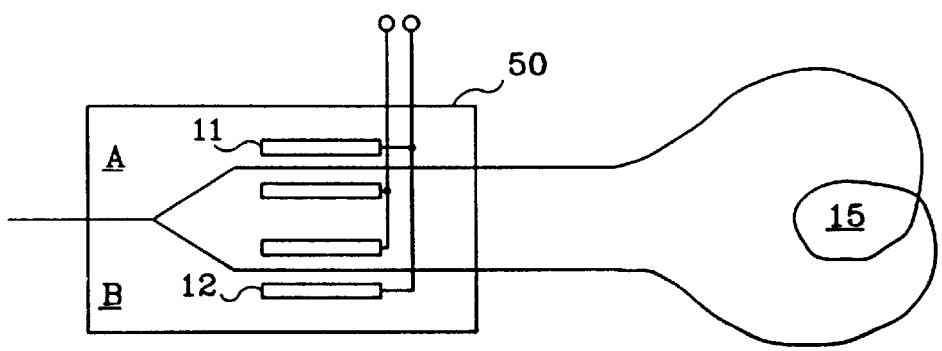
FIG. 10a shows a modulator push-pull configuration on the IOC.

An optimal implementation of a serrodyne loop closure in a push-pull configuration is shown by FIG. 10a. Bias modulation and serrodyne signal lc(t) are applied to modulators 11 and 12 of IOC 50. Serrodyne waveform 53 with 4π resets 49 acts as error suppression modulation. The suppression of amplitude errors takes place for resets 49 having a dimension 59 of n4π and the suppression of intensity errors takes place for n2π and n4π resets, where n is an integer. Conditions for suppression of polarization errors are defined as $$\left\langle \cos\left(\frac{lc(t)}{2}\right)\right\rangle = 0$$

for amplitude errors and <cos(lc(t))>=0 for intensity errors. Thus, all of the amplitude and intensity polarization errors are suppressed by serrodyne waveforms 53 having resets 49 with a dimension 59 of n4π, at non-zero rotation rates.

Another optimal implementation of a serrodyne loop closure in a push-pull configuration of FIG. 10a, with error suppression modulation, is noted here. Bias modulation, serrodyne loop closure signal lc(t) 53 and error suppression signals, shapes of which are shown in FIGS. 9c and 9d as 46 and 47, are applied to modulators 11 and 12 of IOC 50. In general, the bias modulation does not have to be a square wave. Waveforms of shapes 46 and 47 are synthesized within the closed loop. The error suppression requirements for amplitude errors are $$\left\langle \cos\left(\frac{lc(t)}{2}\right)\right\rangle = 0 \text{ and } \left\langle \cos\left(\frac{es(t)}{2}\right)\right\rangle = 0.$$

The error suppression requirements for intensity errors are <cos(lc(t))>=0 and <cos(es(t))>=0. Some of the equations noted above have multiple solutions, e.g., <cos(es(t))>=0, where es(t) is a triangular wave 47 for peak-to-peak amplitudes 57 of 2π, 4π, . . . , n2π, where n is an integer—1, 2, 3, . . . .

Figure 10B:
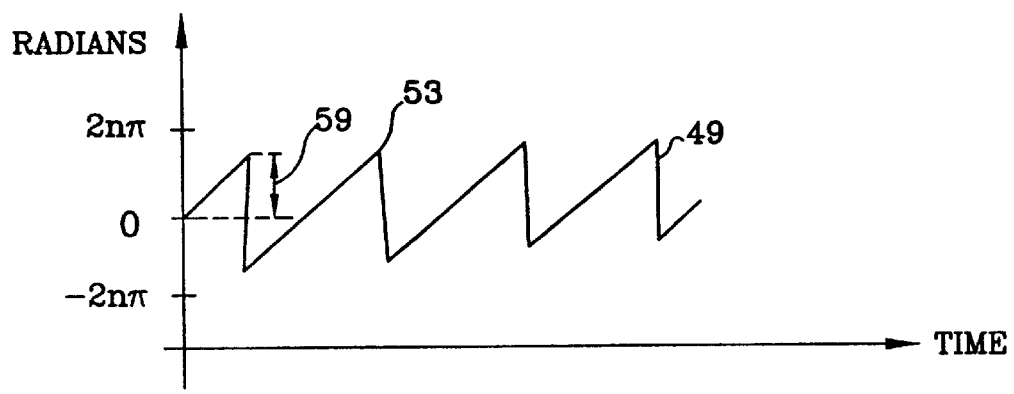
FIG. 10b shows a serrodyne waveform that suppresses both amplitude and intensity polarization errors in a push-pull configuration.

All of the amplitude and intensity polarization errors are suppressed by a serrodyne waveform 53 (of FIG. 10b) with 4π resets at non-zero rates, for the IOC 50 configuration. These errors can also be suppressed by error suppression modulation at all rotation rates provided there is a proper selection of the waveform for the error suppression modulation signals. An error suppression waveform is selected to suppress amplitude or intensity polarization errors. Some waveform (e.g., triangular or square wave) can suppress both kinds of polarization errors at the same time. For sine waveform 46, the suppression of amplitude polarization errors occurs for an amplitude 56 (i.e., a) where $J_o(a)=0$, giving values of about 2.4, 5.52, 8.65 and so on for a. For triangular waveform 47, both amplitude and intensity errors are suppressed for peak-to-peak amplitude 57 of n4π.

The dual ramp waveform, like that of FIG. 7b, having four steps may be used in the IOC 50 configuration of FIG. 10a. Any other waveform will be satisfactory for removing amplitude errors if <cos φ$_2$(t)/2>=0 and intensity errors if. <cos φ$_2$(t)=0>, where φ$_2$ is the suppressing wave into the modulators of IOC 50.

Figure 11A:
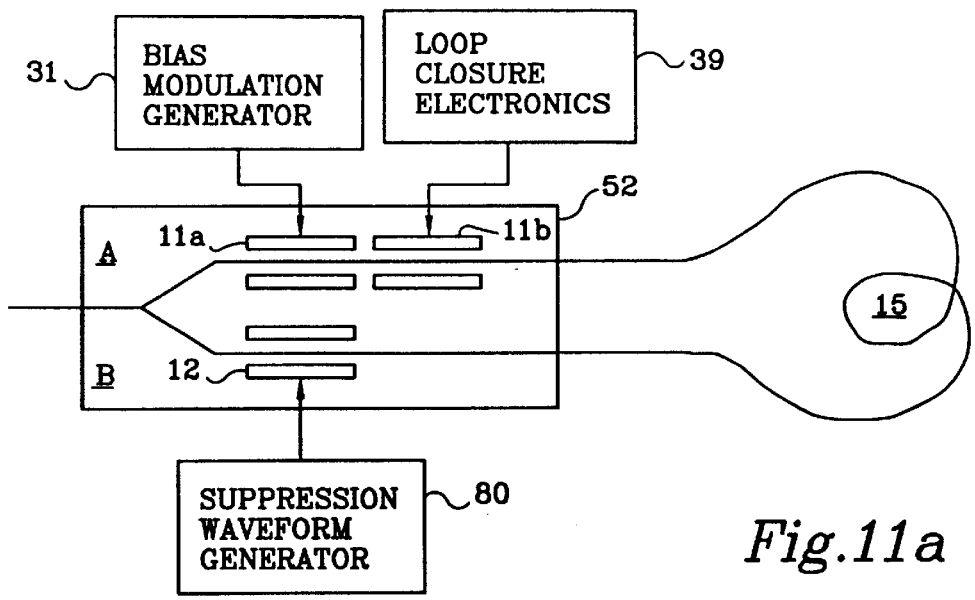
FIGS. 11a and 11b show IOC configurations for inputting both bias modulation signals to one side and an error suppression signal to the other side.
Figure 11B:
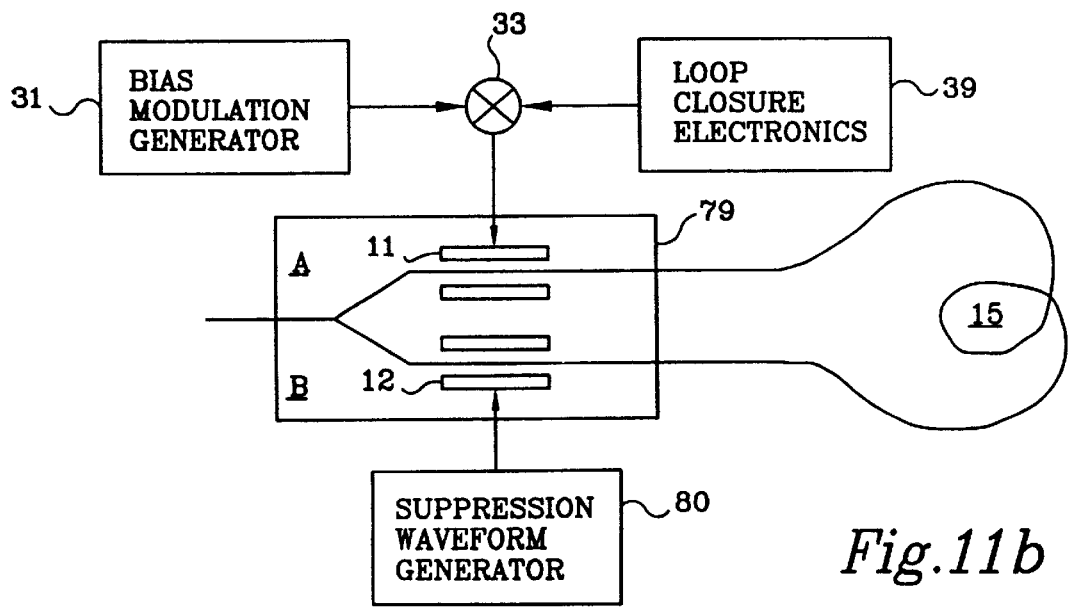

FIG. 11a shows an IOC 52 wherein both the bias modulation and loop closure signals are input to the A side of IOC 52. The bias modulation signal is input to modulator 11a and the loop closure signal is input to modulator 11b. Both of these signals may instead be summed by a summer 33 and input to modulator 11 of IOC 79 shown in FIG. 11b. The carrier suppression signal from suppression waveform generator 80, is input to modulator 12 of side B of IOC's 52 and 79 of FIG. 11a and 11b, respectively. The characteristics of the suppression signal waveform are the same as those for the waveform of the suppression signal input to modulator 12 of IOC 50 in FIG. 5.

Figure 13:
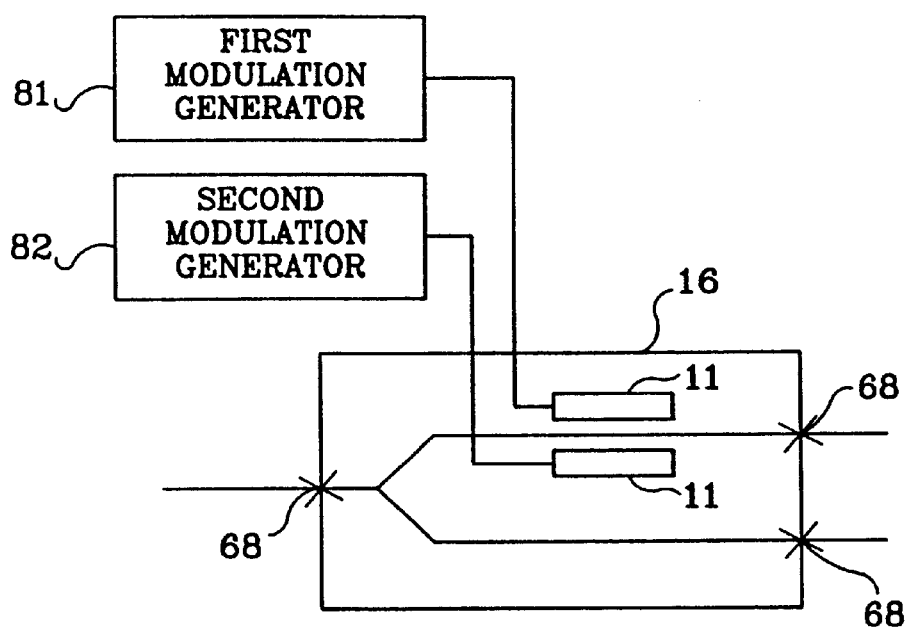
FIG. 13 shows several modulation signal generators connected to one modulator.

FIG. 13 shows how signals from several signal generators (e.g., first and second modulation signal generators 81 and 82) can be applied to one modulator 11 in an additive or differential manner, by applying each of the signals to each electrode of modulator 11, respectively.

Figure 12A:
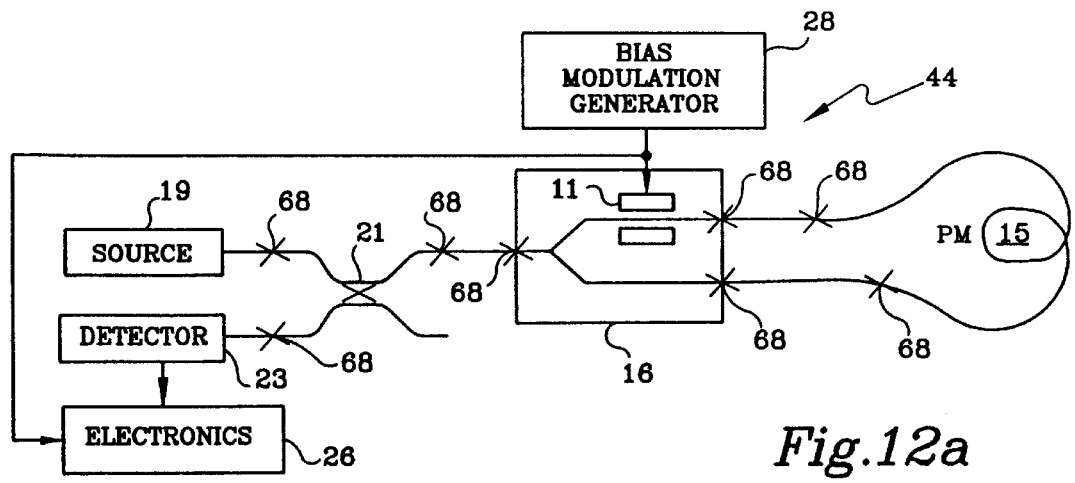
FIGS. 12a and 12b reveal decorrelation schemes for the PM and SM gyroscopes, respectively.

Decorrelation, as noted above, involves adjusting the lengths of the PM fiber between splices in a PM gyroscope, or splices of a depolarizer or depolarizers of an SM gyroscope and depends on the coherence function of the light source. Coherence function is an autocorrelation function. The temporal coherence function determines fringe visibility of the interfering waves. The delays of light are adjusted so that no two waves at the detector are not correlated. Decorrelation is used to suppress remaining errors, if just bias modulation is used to suppress several errors. Decorrelation keeps the primary wave and the cross-coupled waves from interfering with one another. FIG. 12a shows a PM gyroscope 44 having PM fiber splices 68. All lengths of PM fiber between splices 68 and the length of IOC are adjusted to provide the needed decorrelation.

Figure 12B:
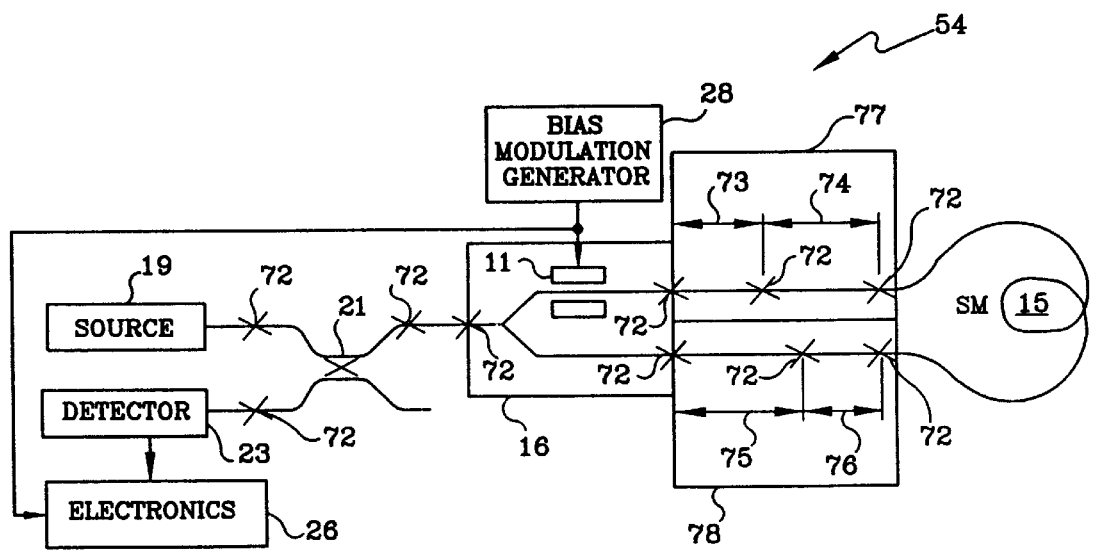

FIG. 12b shows an SM (depolarized) gyroscope 54 having splices 72. Particular lengths 74 and 76 of PM fiber are depolarizers. Gyroscope 54 may be designed with only one depolarizer 74 or 76. All lengths of PM fiber between splices 72 and the length of IOC are adjusted to provide the needed decorrelation.

What is claimed is:

1. A fiber optic gyroscope having polarization error suppression, comprising:
   a light source;
   a polarizer, coupled to said light source, having a pass axis and a reject axis;
   a splitter having a first port coupled to said light source;
   a sensing loop having a first end connected to a second port of said splitter and a second end connected to a third port of said splitter;
   a first modulator proximate to the second port of said splitter; and
   a first signal generator connected to said first modulator; and
   wherein:
      said light source is for providing light to said polarizer;
      light going through the pass axis of said polarizer has a pass polarization state;
      light in the reject axis has a reject polarization state;
      said first modulator is for modulating light in the pass polarization state;
      said splitter is for splitting light into a first primary wave that exits the second port into said sensing loop at the first end, and a second primary wave that exits the third port into said sensing loop at the second end, and for combining the first primary wave that exits the second end of said sensing loop and enters the third port into said splitter, and the second primary wave that exits the first end of said sensing loop and enters the second port into said splitter, and for outputting a combined wave from the first port of said splitter;
      the first and second primary waves have the pass polarization state;
      cross-coupling of a portion of a primary wave results in a secondary wave having the reject polarization state;
      amplitude-type polarization errors arise in the fiber optic gyroscope;
      each amplitude-type polarization error is caused by an interference between a primary wave and a secondary wave; and
      a first modulation signal from said first signal generator suppresses certain amplitude-type polarization errors;
   wherein:
      a type one amplitude-type polarization error is caused by an interference between the first primary wave and a co-propagating secondary wave;
      a type two amplitude-type polarization error is caused by an interference between the first primary wave and a counter-propagating secondary wave;
      a type three amplitude-type polarization error is caused by an interference between the second primary wave and a counter-propagating secondary wave;
      a type four amplitude-type polarization error is caused by an interference between the second primary wave and a co-propagating secondary wave; and
      types one and two amplitude-type polarization errors are opposite in sign and result in reduction of each other;
   and wherein said fiber optic gyro further comprises:
      a second modulator proximate to the third port of said splitter; and
      a second signal generator connected to said second modulator; and
      wherein a second modulation signal from said second signal generator suppresses types three and four amplitude-type polarization errors.

2. The fiber optic gyroscope of claim 1, further comprising:
   an optical fiber interconnected between said sensing loop and said splitter; and
   wherein said optical fiber has splices at certain lengths of the optical fiber so as to provide decorrelation between a primary wave and a secondary wave to suppress certain amplitude-type polarization errors.

3. The fiber optic gyroscope of claim 1, further comprising:
   an optical fiber interconnected between said light source and said splitter; and
   wherein said optical fiber has splices at certain lengths of the optical fiber so as to provide decorrelation between a primary wave and a secondary wave to suppress certain amplitude-type polarization errors.

4. The fiber optic gyroscope of claim 1, wherein the first modulation signal is a bias modulation signal.

5. The fiber optic gyroscope of claim 1 wherein an average cosine of the second modulation signal is approximately equal to zero.

6. The fiber optic gyroscope of claim 5, wherein:
   an intensity-type polarization error is caused by an interference between two secondary waves; and
   the second modulation signal suppresses the intensity-type polarization error at non-zero rotation rates of said sensing loop.

7. The fiber optic gyroscope of claim 1, further comprising:
   an optical fiber interconnected between said sensing loop and said splitter; and
   where said optical fiber has splices at certain lengths of the optical fiber so as to provide decorrelation between a primary wave and a secondary wave to suppress certain amplitude-type polarization errors.

8. The fiber optic gyroscope of claim 1, further comprising:
   an optical fiber interconnected between said light source and said splitter; and
   wherein said optical fiber has splices at certain lengths of the optical fiber so as to provide decorrelation between a primary wave and a secondary wave to suppress certain amplitude-type polarization errors.

9. The fiber optic gyroscope of claim 1, wherein:
   the first modulation signal is a bias modulation signal; and
   a second modulation signal from said second signal generator is a loop closure signal.

10. The fiber optic gyroscope of claim 1, wherein:
    an intensity-type polarization error is caused by an interference between two secondary waves; and
    the second modulation signal suppresses the intensity-type polarization error at non-zero rotation rates of said sensing loop.

11. The fiber optic gyroscope of claim 10 wherein an average cosine of the second modulation signal is approximately equal to zero.

12. The fiber optic gyroscope of claim 11, wherein:
    the loop closure signal has a serrodyne waveform with $n2\pi$ resets; and
    n is an integer greater than zero.

13. The fiber optic gyroscope of claim 11, wherein:
    the loop closure signal is a digital step waveform with $n2\pi$ resets; and
    n is an integer greater than zero.

14. The fiber optic gyroscope of claim 1, further wherein the second modulation signal suppresses types three and four amplitude-type polarization errors.

15. The fiber optic gyroscope of claim 14, wherein intensity errors are suppressed by the loop closure signal, at non-zero rotation rates of said sensing loop.

16. The fiber optic gyroscope of claim 14, wherein intensity errors are suppressed by the error suppression signal.

17. The fiber optic gyroscope of claim 16, wherein an average cosine of the error suppression signal is approximately equal to zero.

18. The fiber optic gyroscope of claim 17, wherein:
the loop closure signal has a serrodyne waveform with n2π resets; and
n is an integer greater than zero.

19. The fiber optic gyroscope of claim 17, wherein:
the loop closure signal is a digital step waveform with n2π resets; and
n is an integer greater than zero.

20. The fiber optic gyroscope of claim 19, wherein:
the error suppression signal is a triangular waveform having a n2π peak-to-peak amplitude; and
n is an integer greater than zero.

21. The fiber optic gyroscope of claim 19, wherein:
the error suppression signal is a sine waveform having a peak amplitude a; and
a Bessel function $J_o(a)=0$.

22. The fiber optic gyroscope of claim 19, wherein:
the error suppression signal is rectangular waveform having an amplitude a; and
$a=(2i+1)\pi/2$ for $i=0, 1, 2, 3 \ldots$.

23. A fiber optic gyroscope having polarization error suppression, comprising:
a light source;
a polarizer, coupled to said light source, having a pass axis and a reject axis;
a splitter having a first port coupled to said light source;
a sensing loop having a first end connected to a second port of said splitter and a second end connected to a third port of said splitter;
a first modulator proximate to the second port of said splitter; and
a second modulator proximate to the third port of said splitter; and
wherein:
said first and second modulators are connected together to form a push-pull modulator;
a signal generator connected to said push-pull modulator;
said light source is for providing light to said polarizer;
light going through the pass axis of said polarizer has a pass polarization state;
light in the reject axis has a reject polarization state;
said push-pull modulator is for modulating light in the pass polarization state;
said splitter is for splitting light into a first primary wave that exits the second port into said sensing loop at the first end, and a second primary wave that exits the third port into said sensing loop at the second end, and for combining the first primary wave that exits the second end of said sensing loop and enters the third port into said splitter, and the second primary wave that exits the first end of said sensing loop and enters the second port into said splitter, and for outputting a combined wave from the first port of said splitter;
the first and second primary waves have the pass polarization state;
cross-coupling of a portion of a primary wave results in a secondary wave having the reject polarization state;
amplitude-type polarization errors arise in the fiber optic gyroscope;
each amplitude-type polarization error is caused by an interference between a primary wave and a secondary wave; and
a modulation signal from said signal generator suppresses certain polarization errors, said modulation signal having a bias modulation signal, a loop closure signal and an error suppression signal, wherein an average cosine of the loop closure signal divided by two is approximately equal to zero.

24. The fiber optic gyroscope of claim 23, further comprising:
an optical fiber interconnected between said sensing loop and said splitter; and
wherein said optical fiber has splices at certain lengths of the optical fiber so as to provide decorrelation between a primary wave and a secondary wave to suppress certain amplitude-type polarization errors.

25. The fiber optic gyroscope of claim 23, further comprising:
an optical fiber interconnected between said light source and said splitter; and
wherein said optical fiber has splices at certain lengths of the optical fiber so as to provide decorrelation between a primary wave and a secondary wave to suppress certain amplitude-type polarization errors.

26. The fiber optic gyroscope of claims 23, wherein the modulation signal is a bias modulation signal and a loop closure signal.

27. The fiber optic gyroscope of claim 26, wherein:
a type one amplitude-type polarization error is caused by an interference between the first primary wave and a co-propagating secondary wave;
a type two amplitude-type polarization error is caused by an interference between the first primary wave and a counter-propagating secondary wave;
a type three amplitude-type polarization error is caused by an interference between the second primary wave and a counter-propagating secondary wave;
a type four amplitude-type polarization error is caused by an interference between the second primary wave and a co-propagating secondary wave; and
the loop closure signal suppresses certain amplitude-type polarization errors at non-zero rotation rates of said sensing loop.

28. The fiber optic gyroscope of claim 27, wherein:
an intensity-type polarization error is caused by an interference between two secondary waves; and
the loop closure signal suppresses the intensity-type polarization error at non-zero rotation rates of said sensing loop.

29. The fiber optic gyroscope of claim 27, wherein the loop closure signal has a dual ramp waveform.

30. The fiber optic gyroscope of claim 27, wherein the dual ramp waveform has at least four steps for each ramp.

31. The fiber optic gyroscope of claim 27, wherein:
the loop closure signal has a serrodyne waveform with n4π resets; and n is an integer greater than zero.

32. The fiber optic gyroscope of claim 23, wherein:
a type one amplitude-type polarization error is caused by an interference between the first primary wave and a co-propagating secondary wave;
a type two amplitude-type polarization error is caused by an interference between the first primary wave and a counter-propagating secondary wave;
a type three amplitude-type polarization error is caused by an interference between the second primary wave and a counter-propagating secondary wave;
a type four amplitude-type polarization error is caused by an interference between the second primary wave and a co-propagating secondary wave; and
the loop closure signal suppresses certain amplitude-type polarization errors at non-zero rotation rates of said sensing loop.

33. The fiber optic gyroscope of claim 23, wherein:
the loop closure signal has a serrodyne waveform with n4π resets; and
n is an integer greater than zero.

34. The fiber optic gyroscope of claim 23, wherein:
the loop closure signal is a digital step sawtooth waveform with n4π resets; and
n is an integer greater than zero.

35. The fiber optic gyroscope of claim 23, wherein an average cosine of the error suppression signal divided by two is approximately equal to zero.

36. The fiber optic gyroscope of claim 35, wherein:
the error suppression signal is a triangular waveform having a n4π peak-to-peak amplitude; and
n is an integer greater than zero.

37. The fiber optic gyroscope of claim 35, wherein:
the error suppression signal is a sine waveform having a peak amplitude a; and
a Bessel function $J_o(a/2)=0$.

38. The fiber optic gyroscope of claim 35, wherein:
the error suppression signal is rectangular waveform having an amplitude a; and
$a=(2i+1)\pi$ for $i=0, 1, 2, 3, \ldots$.

39. A fiber optic gyroscope comprising:
a light source;
a splitter coupled to the light source;
a photodetector coupled to the splitter;
an integrated optics chip coupled to the first splitter and comprising:
a first phase modulator receiving a first modulation signal($\phi_1$); and
a second phase modulator receiving a second modulation signal ($\phi_2$);
a sensing coil transmitting two counter-propagating beams of light, the sensing coil having a first end coupled to the first phase modulator and a second end coupled to the second phase modulator;
a phase signal demodulator coupled to the photodetector; and
phase signal servo electronics coupling said phase signal demodulator to the integrated optics chip and producing the first and second modulation signals; and
wherein the integrated optics chip generates a clockwise co-propagating error signal ($E_{x-cw}$), a clockwise counter-propagating error signal ($E_{x-ccw}$), a counter-clockwise co-propagating error signal ($E_{y-cw}$), and a counter-clockwise counter-propagating error signal ($E_{y-ccw}$), and wherein said second modulation signal is configured to suppress said counter-clockwise co-propagating error signal and said counter-clockwise counter-propagating error signal.

40. The fiber optic gyroscope of claim 39, wherein the integrated optics chip is a proton exchange $LiNbO_3$ chip.

41. The fiber optic gyroscope of claim 40, wherein the integrated optics chip further is a polarizer.

42. The fiber optic gyroscope of claim 39, wherein said first and second modulation signals exhibit a ramp waveform.

43. The fiber optic gyroscope of claim 39, wherein the first and second modulation signals exhibit a sawtooth waveform.

44. The fiber optic gyroscope of claim 39, wherein the first and second modulation signals exhibit a sinusoidal waveform.

45. The fiber optic gyroscope of claim 39, wherein the first and second modulation signals are composed of digital steps.

46. The fiber optic gyroscope of claim 42, wherein the first and second modulation signals are composed of digital steps.

47. The fiber optic gyroscope of claim 43, wherein the first and second modulation signals are composed of digital steps.

48. The fiber optic gyroscope of claim 44, wherein the first and second modulation signals are composed of digital steps.

49. The fiber optic gyroscope of claim 39, wherein the average of $$E_{x-cw}+E_{x-ccw}+E_{y-cw}+E_{y-ccw}=0.$$

50. The fiber optic gyroscope of claim 39, wherein each of $E_{x-cw}$, $E_{x-ccw}$, $E_{y-cw}$, and $E_{y-ccw}$ has an average value of zero.

51. The fiber optic gyroscope of claim 39, wherein the average value of $$E_{x-cw}+E_{y-cw}=0.$$

52. The fiber optic gyroscope of claim 39, wherein the average value of $$E_{x-ccw}+E_{y-ccw}=0.$$

53. The fiber optic gyroscope of claim 51, wherein the average value of $$E_{x-ccw}+E_{y-ccw}=0.$$

54. A method of operating a fiber optic gyroscope, said method comprising the steps of:
providing said fiber optic gyroscope, said fiber optic gyroscope having a light source coupled to a sensing coil via a splitter, said splitter including at least one phase modulator;
providing a light from said light source to said sensing coil, said light being divided into a clockwise beam and a counter-clockwise beam at said splitter, wherein said splitter produces a polarization error signal having at least four components corresponding to a clockwise co-propagating error signal ($E_{x-cw}$), a clockwise counter-propagating error signal ($E_{x-ccw}$), a counter-clockwise co-propagating error signal ($E_{y-cw}$), and a counter-clockwise counter-propagating error signal ($E_{y-ccw}$);
modulating said clockwise and counter-clockwise beams with a modulation signal applied at said phase modulator, said modulation signal being configured to suppress at least said counter-clockwise components in said polarization error signal.

55. The method of claim 54, wherein the average of $$E_{x\text{-}cw}E_{x\text{-}ccw}+E_{y\text{-}cw}+E_{y\text{-}ccw}=0.$$

56. The method of claim 54, wherein each of $E_{x\text{-}cw}$, $E_{x\text{-}ccw}$, $E_{y\text{-}cw}$, and $E_{y\text{-}ccw}$ has an average value of zero.

57. The method of claim 54, wherein the average value of $$E_{x\text{-}cw}+E_{y\text{-}cw}=0.$$

58. The method of claim 54, wherein the average value of $$E_{x\text{-}ccw}+E_{y\text{-}ccw}=0.$$

59. The fiber optic gyroscope of claim 57, wherein the average value of $$E_{x\text{-}ccw}+E_{y\text{-}ccw}=0.$$

* * * * *